United States Patent [19]
Fujita et al.

[11] Patent Number: 5,278,457
[45] Date of Patent: Jan. 11, 1994

[54] METHOD AND APPARATUS FOR ADJUSTING CLOCK SIGNAL OF ELECTRONIC APPARATUS

[75] Inventors: Yuzuru Fujita; Seiichi Kawashima; Bunichi Fujita; Sakoh Ishikawa, all of Hadano; Noboru Masuda, Kokubunji, all of Japan

[73] Assignee: Hitachi, Ltd., Tokyo, Japan

[21] Appl. No.: 901,149

[22] Filed: Jun. 19, 1992

[30] Foreign Application Priority Data

Jun. 21, 1991 [JP] Japan ................... 3-175832

[51] Int. Cl.[5] .............................. A03K 5/15
[52] U.S. Cl. .................... 307/269; 328/63; 328/55; 328/72
[58] Field of Search .......... 307/269, 591, 511, 310; 328/155, 63, 55

[56] References Cited

U.S. PATENT DOCUMENTS

| | | | |
|---|---|---|---|
| 4,475,085 | 10/1984 | Yahata et al. | 328/55 |
| 4,924,111 | 5/1990 | Anderson et al. | 307/310 |
| 5,024,535 | 6/1991 | Winston, Jr. | 307/310 |
| 5,043,596 | 8/1991 | Masuda et al. | 328/63 |
| 5,046,859 | 9/1991 | Yamaguchi | 307/310 |
| 5,087,829 | 2/1992 | Ishihashi et al. | 307/269 |
| 5,150,068 | 9/1992 | Kawashimo et al. | 328/63 |
| 5,184,027 | 2/1993 | Masuda et al. | 307/269 |

*Primary Examiner*—John S. Heyman
*Assistant Examiner*—T. T. Lam
*Attorney, Agent, or Firm*—Antonelli, Terry, Stout & Kraus

[57] ABSTRACT

The invention relates to method and apparatus for adjusting a clock signal which is supplied to an electronic apparatus. After the turn-on of a power source of the electronic apparatus, it is detected that a temperature of at least a part of devices in the electronic apparatus substantially reaches a saturation state. When the temperature of the device reaches the saturation state, a phase adjustment of the clock signal of the electronic apparatus is executed. After completion of the phase adjustment of the clock signal, its adjusting state is fixed.

14 Claims, 7 Drawing Sheets

METHOD AND APPARATUS FOR ADJUSTING CLOCK SIGNAL OF ELECTRONIC APPARATUS

BACKGROUND OF THE INVENTION

The invention relates to a phase adjusting method and apparatus of a clock and, more particularly, to a phase adjusting method and apparatus of a clock which is suitable for use in an electronic computer, a communicating apparatus, or the like of a short machine cycle time that has a clock system having a phase adjusting circuit to reduce a clock skew, an electronic apparatus using such a phase adjusting method, and a semiconductor integrated circuit for embodying the phase adjusting method.

Generally, to reduce the machine cycle time of a large scale computer or the like, it is necessary to minimize the skew of a clock signal of a whole system. Hitherto, to minimize the skew of the clock signal, a method of adjusting the phase of the clock signal is used.

However, a semiconductor device which is used in an electronic apparatus as well as a large scale electronic computer has a temperature dependency of a signal delay time. Therefore, a conventional technique which merely performs the phase adjustment has a problem such that after the phase of the clock signal was adjusted, when a variation in temperature change occurs among the devices in the apparatus, a clock skew is caused.

As a technique which can solve such a problem, for instance, there is known a technique disclosed in U. S. Pat. No. 5,043,596 assigned to Hitachi Ltd.

The above document teaches a method of intermittently executing the phase adjustment of a clock in a real time manner by switching a delay circuit while always detecting a temperature. The above method is effective to execute the severe phase adjustment in a real time manner in a system in which a temperature change of the device is severe during the operation of the apparatus. However, a temperature compensating circuit is complicated and a management of advanced LSI circuit manufacturing processes is necessary in order to raise the accuracy of the temperature detection. It is, therefore, difficult to realize such a conventional technique in a general large scale computer.

SUMMARY OF THE INVENTION

Generally, in an electronic apparatus of a large scale computer or the like, there is a temperature change of an LSI chip for a period of time from the turn-on of a power source to a time point at which the apparatus reaches a thermal equilibrium state. However, a temperature change after the apparatus reached the thermal equilibrium state is extremely small. Moreover, there is a feature such that the time which is required until the apparatus reaches the thermal equilibrium state is sufficiently short as compared with a whole initialization processing time of the electronic apparatus.

It is an object of the invention to provide a phase adjusting method of a clock in which a skew of a clock signal that is generated due to a temperature dependency of a signal delay time of the semiconductor device can be suppressed by using a thermal feature of the device of the electronic apparatus without performing a real-time phase adjustment and, further, to provide the electronic apparatus using such a method and a semiconductor integrated circuit.

According to the invention, the above object of the invention is accomplished by performing the phase adjustment after the LSI chip reached the thermal equilibrium state and the temperature of LSI chip was saturated.

That is, the above object is accomplished by providing means for confirming that the temperature of each LSI chip in the electronic apparatus was saturated and by executing the phase adjustment of the clock signal at a time point when the above means detects that each device has reached the thermal equilibrium state and the LSI chip temperature has been saturated and by fixing the clock into the phase adjustment state after the clock phase adjustment was performed.

Consequently, the skew of the clock signal which is generated due to the temperature dependency of the signal delay time of the semiconductor device can be suppressed without executing the phase adjustment is a real time manner.

As one of the methods of judging whether the LSI chip has reached a thermal equilibrium point or not, it is possible to use a method whereby temperature changes of all of the devices in the electronic apparatus or temperature changes of a part of the devices are previously measured or predicted, thereby obtaining a time which is required until each device reaches a temperature equilibrium state after the turn-on of the power source, and a time which is required until the phase adjustment of the clock signal is started after the turn-on of the power source is controlled by a timer.

As an embodiment of the invention, there is a method whereby a mechanism to measure temperatures of all of or a part of the devices in the electronic apparatus is provided, the temperatures of the devices are measured by such a mechanism, a state in which the device reaches a temperature equilibrium state is recognized by a minicomputer for control or the like called a service processor, and the phase adjustment of the clock signal is started.

The object of the invention is accomplished by constructing an electronic apparatus by using phase adjusting means by a phase adjusting method of a clock signal by the invention or by realizing an LSI chip of a circuit to construct the phase adjusting means and by providing a temperature measuring mechanism into such an LSI chip.

Since the phase adjustment of the clock signal is executed at a time point when the devices constructing the electronic apparatus reach the thermal equilibrium state and the temperatures of the devices are saturated, the skew due to the temperature change is not increased after completion of the phase adjustment. On the other hand, since the phase adjustment is performed in the state of the real operation temperature, the phase adjustment also including a delay variation due to temperature differences among the devices can be performed.

According to the invention, a high reliability can be obtained by a simple circuit as compared with the method of performing the phase adjustment of the clock in a real time manner as in the foregoing conventional technique. According to the invention, since the clock phase is fixedly used in a general operating state of an electronic apparatus, a probability such that a deviation occurs in the clock phase by a malfunction of a phase adjusting circuit due to a cause such as noises or the like can be remarkably reduced and a high reliability can be obtained.

DESCRIPTION OF THE PREFERRED EMBODIMENTS

Figure 1:
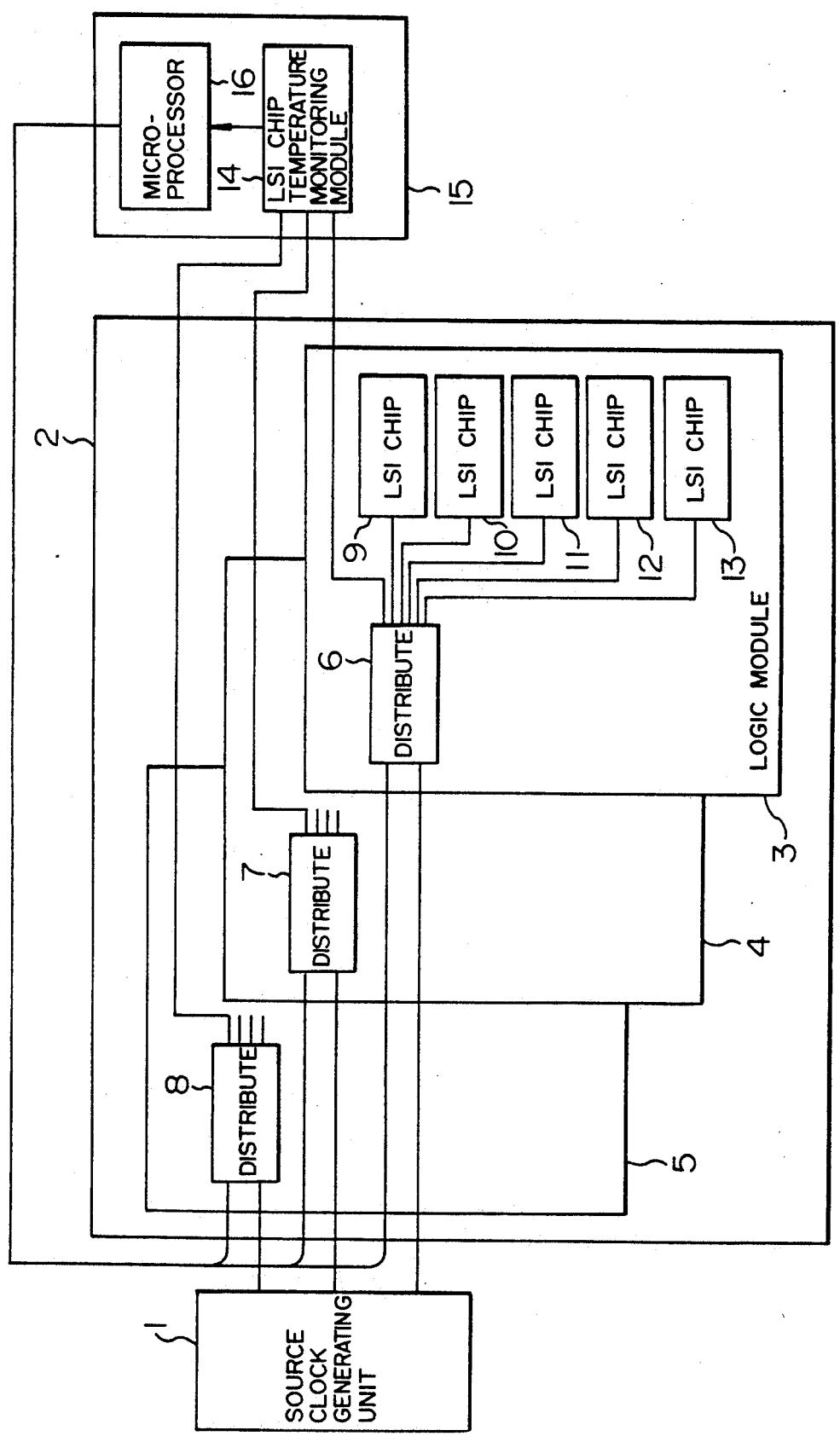
FIG. 1 is a block diagram of a clock system of a large scale computer to which a clock signal adjusting method of the invention is applied.

An embodiment of a phase adjusting method of a clock according to the invention will be described in detail hereinbelow with reference to the drawings.

In FIGS. 1 to 4, reference numeral 1 denotes a source clock generating unit; 2 a logic block; 3 to 5 logic modules; 6 to 8 clock distributing LSI chips; 9 to 13 general logic LSI chips; 14 an LSI chip temperature monitoring module; 15 a service processor; 16 a microprocessor; 201 a temperature detecting circuit; 202 a phase adjustment control circuit; 203 a phase control circuit; 204 a phase comparing circuit; 205 and 206 variable delay circuits; 207 a frequency division distributing circuit; 301 a non-volatile memory device; 302 to 304 crystal oscillators; 305 a selector; 306 a frequency division distributing circuit; 307 to 310 variable delay circuits; 311 a delay control circuit; 403 a transistor to measure a temperature; 404 a constant current source; and 405 an A/D converter.

In FIG. 1, a source clock and a phase reference signal generated by the source clock generating unit 1 are transmitted to a plurality of logic modules 3 to 5 in the logic block 2. The clock signal transmitted to the logic modules 3 to 5 is given to the clock distributing LSI chips 6 to 8 having the phase adjusting mechanism in each logic module and are frequency divided and distributed by the clock distributing LSI chips 6 to 8 and transmitted to each general logic LSI chip in the logic module.

In FIG. 1, the above portion is shown with respect to only the logic module 3. The clock signal which has been frequency divided and distributed by the clock distributing LSI chip 6 is transmitted to the general logic LSI chips 9 to 13.

Figure 3:
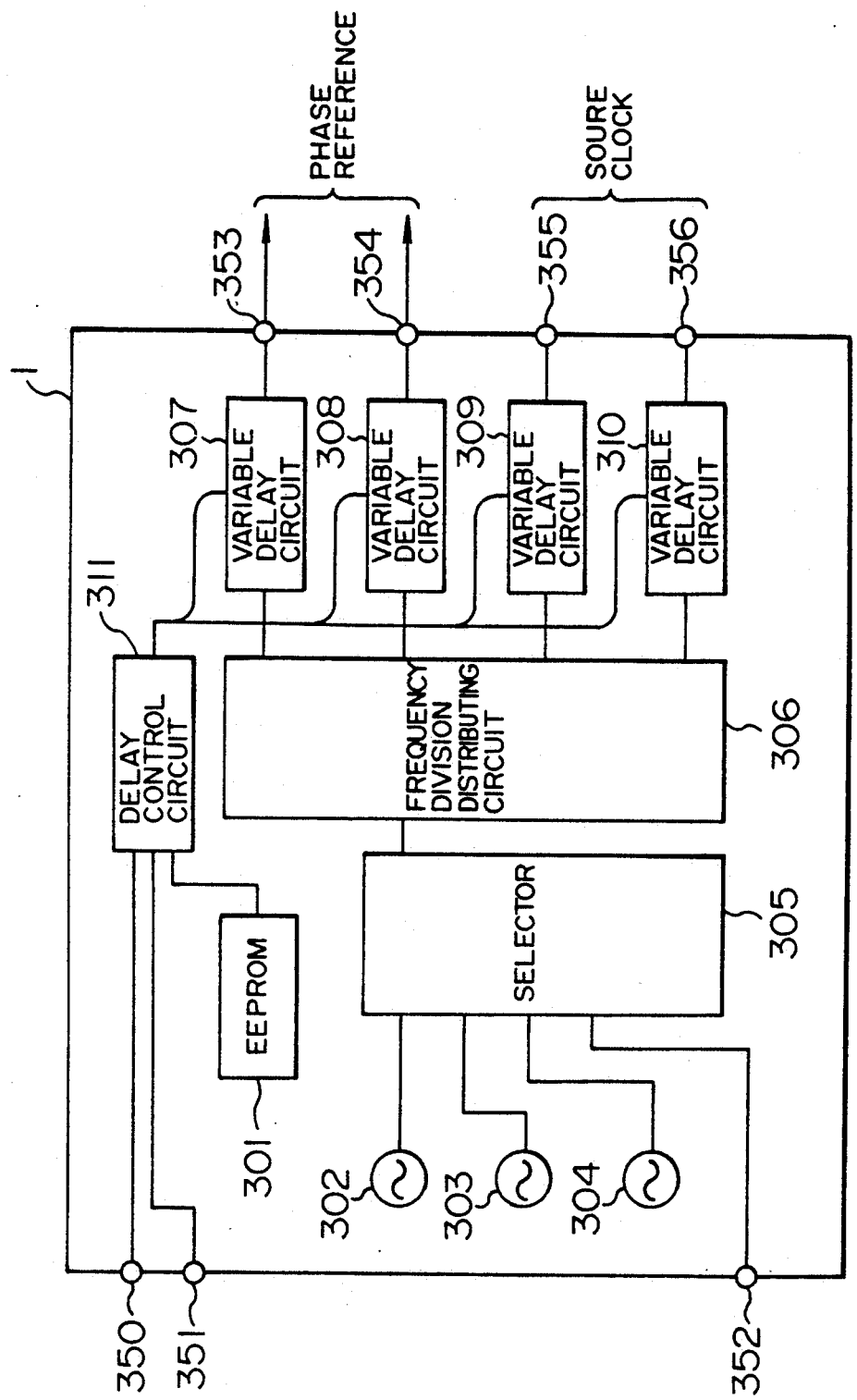
FIG. 3 is a block diagram of the inside of a source clock generating unit in FIG. 1.

FIG. 3 shows an internal construction of the source clock generating unit 1. In FIG. 3, to simplify the drawing, the variable delay circuits 307 to 310 and clock output terminals 353 to 356 of the numbers which are respectively smaller than the actual numbers are shown.

In FIG. 3, one of outputs of the crystal oscillators 302 to 304 of different frequencies is selected by the selector 305 to which a selection signal 352 is given. The selected output is supplied to the frequency division distributing circuit 306 and is frequency divided and distributed. The frequency division distributing circuit 306 generates a source clock and a phase reference signal having a period that is 16 times as high as the source clock. The source clock and the phase reference signal pass through the variable delay circuits 307 to 310 and are generated from the phase reference signal output terminals 353 and 354 and from the source clock output terminals 355 and 356.

The phase reference signals and source clock at the output terminals 353 to 356 of the source clock generating unit 1 have been adjusted to a predetermined skew or less by the variable delay circuits 307 to 310 in the source clock generating unit 1.

The phase adjustment of the clock signal at each of the output terminals 353 to 356 of the source clock generating unit 1 is executed by using a dedicated skew tester. The dedicated skew tester measures the skew of each of the output terminals 353 to 356. On the basis of the results of the measurement of the skews, delay amounts of the variable delay circuits 307 to 310 are changed, thereby minimizing the skew of each of the output terminals 353 to 356. The set states of the variable delay circuits 307 to 310 in this instance are stored into the non-volatile memory device 301 provided in the source clock generating unit 1. When a power source of the electronic apparatus such as a large scale computer or the like is turned on, the adjustment data of the variable delay circuits 307 to 310 stored in the memory device 301 are read out by the delay control circuit 311 and used to set the delay amounts of the variable delay circuits 307 to 310.

A construction of the clock distributing LSI chip 6 will now be described with reference to FIG. 2.

The LSI chip shown in the diagram is constructed by providing therein a clock phase adjustment control mechanism to embody the phase adjusting method of the clock signal according to the invention and a temperature measuring mechanism.

Figure 2:
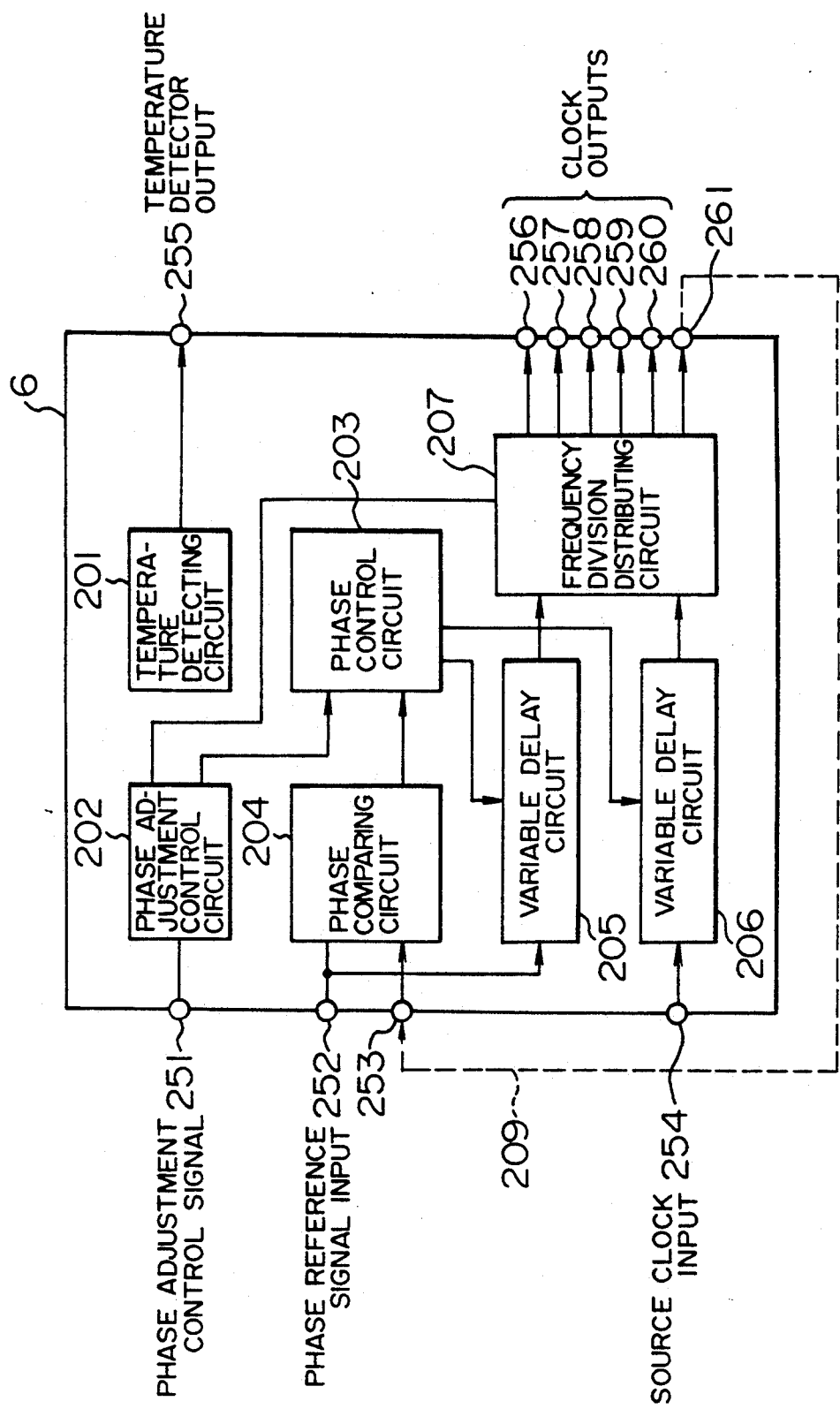
FIG. 2 is a block diagram of the inside of a clock distributing LSI circuit in FIG. 1.

In FIG. 2, the source clock of a high frequency generated by the source clock generating unit 1 and the phase reference signal having a period that is 16 times as high as the source clock are respectively supplied to terminals 252 and 254 and pass through the variable delay circuits 205 and 206. After that, they are sent to the frequency division distributing circuit 207 and are generated from clock output terminals 256 to 260. Since the phase reference signal is also used as a sync signal in the frequency division distributing circuit 207, it is transmitted through the variable delay circuit 205 and is led to the frequency division distributing circuit. The variable delay circuits 205 and 206 are always set to the same delay time, thereby preventing that the phase relation between the phase reference signal and the source clock signal changes at an input terminal of the frequency division distributing circuit 207. Consequently, a synchronous allowance of both signals is assured.

The phase adjusting function of the clock distributing LSI chip 6 as mentioned above will now be described.

The frequency division distributing circuit 207 frequency divides the source clock signal into the 1/16 frequency. The resultant signal is supplied to a feedback signal output terminal 261 and is sent to the phase comparing circuit 204 through a feedback wiring 209 other than the LSI chip. On the other hand, the phase reference signal is supplied to the clock distributing LSI chip 16. Since the phase reference signal has a period that is 16 times as high as the source clock, the frequencies of the feedback signal and phase reference signal which are supplied to the phase comparing circuit 204 are equal.

The phase of the feedback signal is compared with the phase of the phase reference signal by the phase comparing circuit 204. The phase comparing circuit 204 transfers a phase difference between the phase reference signal and the feedback signal to the phase control circuit 203. The phase control circuit 203 switches the variable delay circuits 205 and 206 in such a direction as to reduce the phase difference between the feedback signal and the phase reference signal.

As mentioned above, the variable delay circuits 205 and 206 are controlled so as to always have the same delay time. The phase adjustment control circuit 202 receives a phase adjustment control signal from the service processor and has a function to switch between the phase adjusting mode and the phase fixing mode for the phase control circuit 203 and a function to stop the generation of the clock for the frequency division distributing circuit 207. The clock generation is stopped to make inoperative the general logic LSI chips 9 to 13 in the logic module during the phase adjustment and to prevent that the phase comparing accuracy of the phase comparing circuit 204 is dropped due to the noises by the operations of the general logic LSI chips 9 to 13.

The clock phase adjusting method according to the invention is used for the control of the phase adjustment control circuit 202 mentioned above.

That is, the temperature detecting circuit 201 provided in the clock distributing LSI chip 6 detects a temperature of LSI chip and generates an analog signal according to the detected temperature. As shown in FIG. 1, the detection temperature signal is led to the LSI chip temperature monitoring module 14 in the service processor 15. The service processor including the LSI chip temperature monitoring module 14 monitors the temperatures of all of the clock distributing LSI chips. At a time point when all of the clock distributing LSI chips reach the saturation temperature and reach the thermal equilibrium state or reach a temperature sufficiently close to the saturation temperature, a control signal to start the phase adjustment is sent to all of the clock distributing LSI chips, thereby setting the clock distributing LSI chips into the phase adjusting mode.

After the elapse of the enough time to finish the phase adjustment by a timer (not shown) provided in the service processor 15, the service processor 15 can also switch the clock distributing LSIs into the phase fixing mode.

After that, the delay times of the variable delay circuits 205 and 206 of the clock distributing LSI chips are fixed until the power source of the electronic apparatus of the large scale computer or the like using the phase adjusting method according to the invention is shut off or the clock adjustment is instructed by a control console.

The LSI chip temperature monitoring module 14 is also used to monitor the cooling function of the electronic apparatus such as a large scale computer or the like by monitoring the temperatures of LSI chips.

Figure 4:
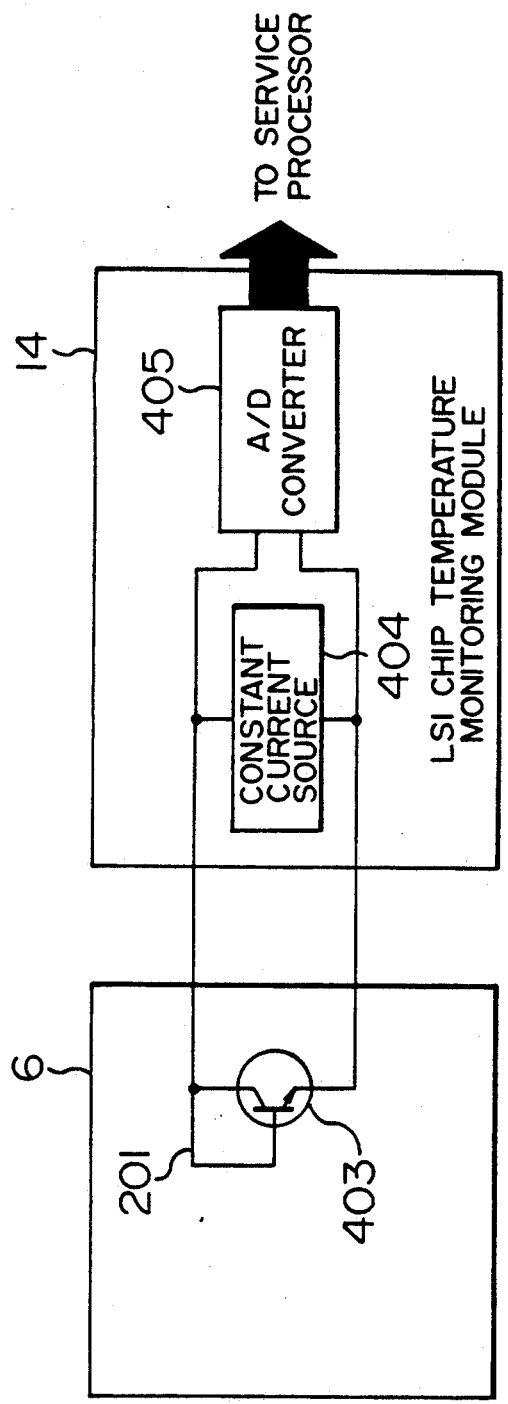
FIG. 4 is a diagram for explaining a method of measuring a temperature of LSI circuit.

A method of measuring a temperature of the clock distributing LSI chip will now be described with reference to FIG. 4.

As a temperature measuring device in the clock distributing LSI chip, the transistor 403 provided in the clock distributing LSI chip is used. A constant current is supplied to the transistor 403 from the constant current source 404 in the LSI chip temperature monitoring module 14.

Generally, a potential between the base and emitter of the transistor when a constant current is supplied has a temperature dependency and fluctuates due to a temperature change. Therefore, by supplying a potential difference between the base and the emitter to the A/D converter 405 and by detecting a fluctuation of the potential difference, a temperature change can be measured. An output of the A/D converter 405 is led to the microprocessor 16 in the service processor. The microprocessor discriminates whether the temperatures of all of the clock distributing LSI chips have reached the equilibrium state or not and sends a phase adjustment control signal to all of the clock distributing LSI chips on the basis of the results of the discrimination.

Figure 5:
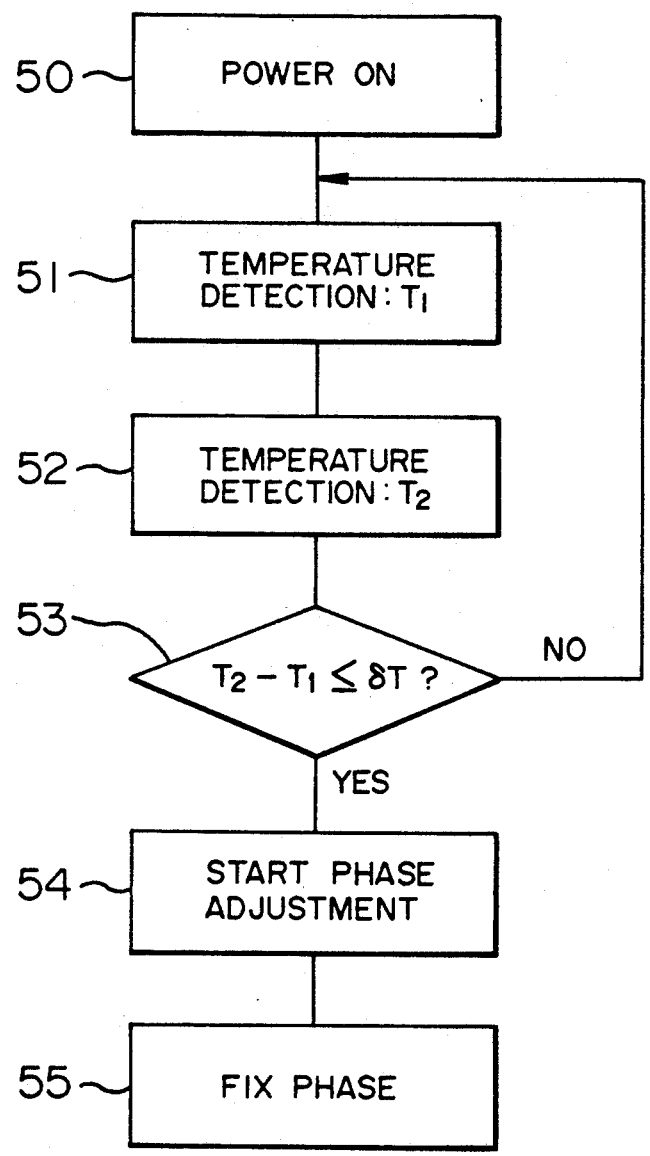
FIG. 5 is a flowchart of an embodiment of a control method which is executed for a period of time until the start of a phase adjustment after the turn-on of a power source.

FIG. 5 shows a flowchart for the phase adjustment start control by the microprocessor 16.

When the power source is turned on in step 50, an output of the A/D converter 405 is fetched in step 51 and a temperature $T_1$ of the transistor 403 is measured. After the elapse of a predetermined time, the output of the A/D converter 405 is again fetched in step 52 and a temperature $T_2$ of the transistor 403 is measured. In step 53, the values of the temperatures $T_1$ and $T_2$ are compared and a check is made to see if $T_2 - T_1$ is equal to or lower than a predetermined temperature $\delta T$ or not. When $T_2 - T_1$ is larger than the predetermined temperature $\delta T$, it is determined that the transistor 403 doesn't reach the thermal equilibrium state, so that the processing routine is returned to step 51. When $T_2 - T_1$ is equal to or lower than the predetermined temperature $\delta T$, a phase adjustment control signal to start the phase adjustment is generated and given to a terminal 251 of the clock distributing LSI circuit in step 54. After the elapse of a predetermined time for the phase adjustment, a phase adjusting state (delay amount) is fixed in step 55.

According to the embodiment of the invention mentioned above, since the phase adjustment of the clock signal is executed at a time point at which the devices such as LSI chips or the like constructing the electronic apparatus reach the thermal equilibrium state and the temperatures of the devices are saturated, an increase in skew due to a temperature change doesn't occur after completion of the phase adjustment. Therefore, an allowance degree of the temperature dependency of the signal delay of the circuit due to the semiconductor device can be increased. On the other hand, in case of using the semiconductors having the same temperature dependency of the signal delay, an allowance degree of the temperature differences among the LSI chips can be enlarged, so that a degree of freedom in selection of a cooling system can be raised.

Further, since the variable delay circuits are fixedly used after completion of the phase adjustment, there is no need to execute the phase adjustment in a real-time manner as in the conventional technique. A circuit scale of devices can be reduced. Since the phase control system is fixed after the phase adjustment, it is possible to prevent that a deviation occurs in the clock phases by the malfunction of the phase adjusting circuit.

Another embodiment in which a timing to start the phase adjustment is determined by measuring the elapsed time after the turn-on of the power source without directly detecting the temperatures will now be described.

Figure 6:
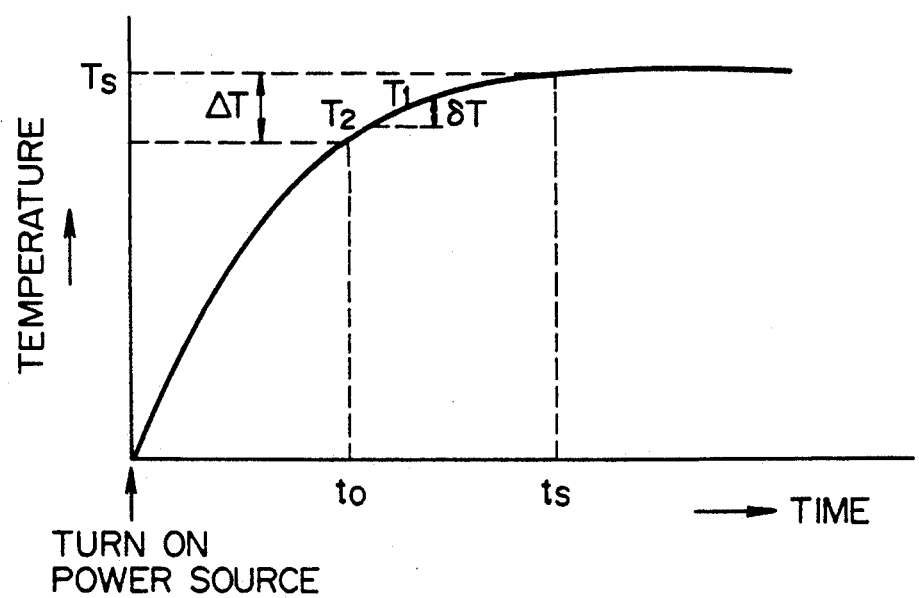
FIG. 6 is a curve showing temperature saturation characteristics in an LSI chip.

FIG. 6 is a graph showing a temperature change after the turn-on of the power source of the LSI chip. As shown in the diagram, the temperature increases to a saturation temperature $T_s$ after the elapse of a certain time $t_s$ after the turn-on of the power source and doesn't change after that. It is, therefore, sufficient to measure the time by a counter and to execute the phase adjustment at a time point of $t_s$. However, since there is a temperature range $\Delta T$ in which the skew is permitted, the phase adjustment can be also performed at a time point of $t_0$ of $T_s - \Delta T$.

Since a curve of the temperature saturation characteristics of FIG. 6 changes in dependence on the kind of LSI chip and the format or construction of the electronic apparatus, it is previously experimentally determined. The value of $\Delta T$ in FIG. 6 is also decided when designing because it differs depending on the electronic apparatus.

Figure 7:
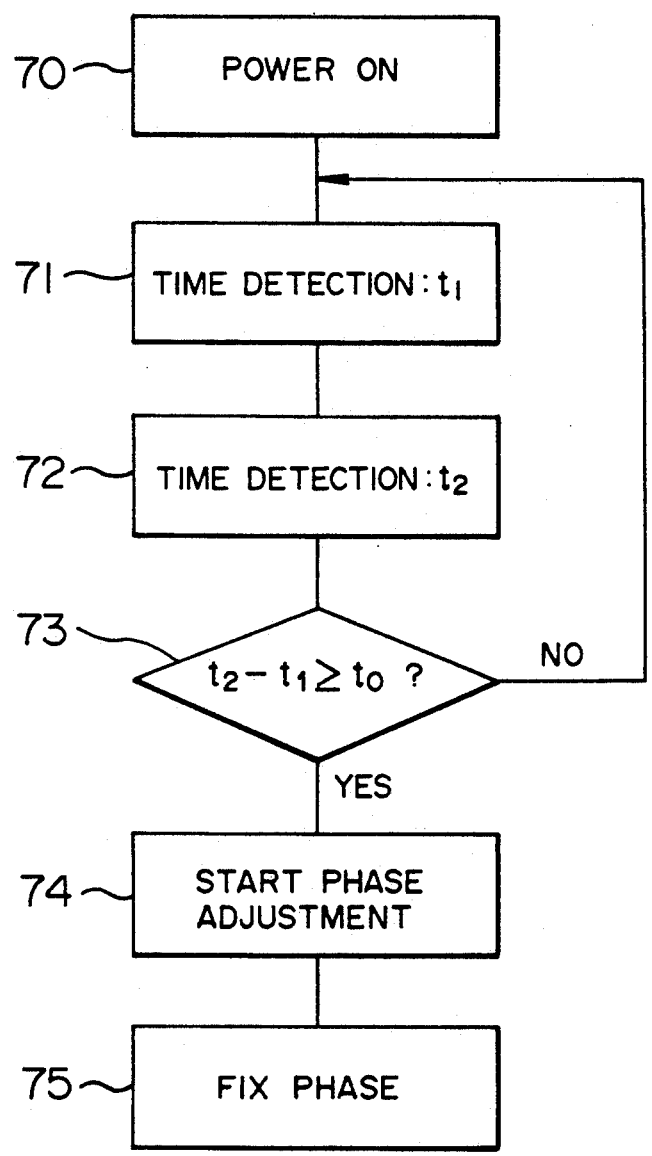
FIG. 7 is a flowchart of another embodiment of the control method which is executed for a period of time until the start of the phase adjustment after the turn-on of the power source.

FIG. 7 is a flowchart for the control which is executed by the microprocessor 16 to control the start of the phase adjustment by using the temperature saturation characteristics of FIG. 6. When the power source is turned on in step 70, the counter (not shown) in the service processor 15 detects a time $t_1$ in step 71. After the elapse of a predetermined time, a time $t_2$ is again detected in step 72. A check is made in step 73 to see if a difference between the times $t_2$ and $t_1$ is equal to or larger than $t_0$ in FIG. 6 or not. When $t_2 - t_1$ is smaller than $t_0$, it is determined that the transistor 403 doesn't reach the thermal equilibrium state, so that the processing routine is returned to step 71. When $t_2 - t_1$ is equal to or larger than $t_0$, the phase adjustment control signal to start the phase adjustment is generated in step 74 and sent to the terminal 251 of the clock distributing LSI circuit. After the elapse of a predetermined time for phase adjustment, the phase adjusting state (delay amount) is fixed in step 75.

According to the invention as described above, the skew of the clock signal which is generated due to the temperature dependency of the signal delay time of the semiconductor device can be suppressed without performing the phase adjustment in a real-time manner.

What is claimed is:

1. A method of adjusting a clock signal which is supplied to an electronic apparatus, comprising the steps of:
   detecting that a temperature of at least a part of devices in the electronic apparatus substantially reaches a saturation state after the turn-on of a power source of the electronic apparatus;
   executing a phase adjustment of the clock signal of the electronic apparatus when the temperature of said device reaches the saturation state; and
   fixing an adjusting state after completion of the phase adjustment of the clock signal.

2. A method according to claim 1, wherein after the turn-on of the power source of the electronic apparatus, a temperature change of said at least part of said devices in the electronic apparatus is measured, and when the temperature of said device substantially reaches a predetermined state, said saturation state is detected.

3. A method according to claim 2, wherein the phase adjustment is executed when the temperature change of said device is equal to or less than a predetermined value.

4. A method according to claim 3, wherein said partial device is a device in which a time which is required until said device reaches a temperature equalibrium state is longest among the devices in the electronic apparatus.

5. A method according to claim 2, wherein in the adjustment of the clock signal, a difference between a phase of a predetermined reference clock signal and a phase of said clock signal is detected and the phase of the clock signal is adjusted so as to keep said phase difference constant.

6. A method according to claim 2, wherein the saturation state is detected when a predetermined time corresponding to time which is required until the temperature reaches the temperature equilibrium state of the electronic apparatus after the turn-on of the power source elapses.

7. A method according to claim 6, wherein said predetermined time is determined by experimentally measuring a time which is required until the temperatures of the devices constructing the electronic apparatus substantially reach a predetermined temperature after the turn-on of the power source of the electronic apparatus.

8. An apparatus for adjusting a clock signal of an electronic apparatus, comprising:
   a clock signal generating source;
   means for fixing an adjusting state by adjusting a phase of the clock signal from said clock signal generating source in response to a phase adjustment start signal;
   an electronic apparatus which receives the distributed signals of said clock signal from said clock signal adjusting means;
   means for measuring a temperature of at least a part of the devices in said electronic apparatus; and
   control means for detecting a time-dependent change in said temperature from the measured temperature of said device after the turn-on of a power source of the electronic apparatus and for generating said phase adjustment start signal when said temperature change is substantially extinguished.

9. An apparatus according to claim 8, wherein said means for measuring the temperature of the device includes means for measuring a voltage across a base and an emitter of a transistor.

10. An apparatus according to claim 8, wherein said electronic apparatus as a semiconductor integrated circuit.

11. An apparatus for adjusting a clock signal of an electronic apparatus, comprising:
   a clock signal generating source;
   means for fixing an adjusting state by adjusting a phase of said clock signal from said clock signal generating source in response to a phase adjustment start signal;
   an electronic apparatus which receives the distributed signals of the clock signal from said clock signal adjusting means;
   means for measuring an elapsed time after the turn-on of a power source of the electronic apparatus; and
   control means for generating said phase adjustment start signal when a predetermined time corresponding to a time which is required until the temperature reaches a temperature equilibrium state of the electronic apparatus after the turn-on of the power source elapses.

12. An apparatus according to claim 11, wherein said electronic apparatus is a semiconductor integrated circuit.

13. An apparatus for adjusting a clock signal of an electronic computer, comprising:

a source clock signal generating unit;

a clock distributing unit for fixing an adjusting state by adjusting a phase of the clock signal from said source clock signal generating source in response to a phase adjustment start signal and for generating the adjusted clock signal;

a logic block which receives the distributed signals of said adjusted clock signal from said clock distributing unit;

a temperature detecting circuit to measure a temperature of at least a part of devices of said clock distributing unit; and control means for detecting a time-dependent change in said temperature from said measured temperature of said device after the turn-on of the power source of the electronic computer and for generating said phase adjustment start signal when said temperature change is substantially extinguished.

14. An apparatus for adjusting a clock signal of an electronic computer, comprising:

a source clock signal generating unit;

a clock distributing unit for fixing an adjusting state by adjusting a phase of the clock signal from said clock signal generating source in response to a phase adjustment start signal and for generating the adjusted clock signal;

a logic block which receives the distributed signals of said adjusted clock signal from said clock distributing unit;

means for measuring an elapsed time from the turn-on of a power source of the electronic computer; and control means for generating said phase adjustment start signal when a predetermined time corresponding to a time which is required until the temperature reaches a temperature equilibrium state of the electronic apparatus after the turn-on of the power source elapses.

* * * * *